Patented Jan. 3, 1950

2,493,445

UNITED STATES PATENT OFFICE 2,493,445

METHOD FOR STABILIZING SULFATED PRODUCTS

John Randolph Clark, Nutley, John David Malkemus, Allendale, and John Ross, Ramsey, N. J., assignors to Colgate-Palmolive-Peet Company, Jersey City, N. J., a corporation of Delaware No Drawing. Application July 1, 1946, Serial No. 680,854

7 Claims. (Cl. 260—400)

This invention relates to a method for stabilizing reaction products obtained by sulphating hydroxy compounds such as various mono- or polyhydric alcohols, partial esters, ethers or other derivatives thereof in which there remain at least one free hydroxy group, etc., by the use of sulphamic acid as sulphating agent. The invention relates further to compositions of matter comprising reaction products of this nature which have been treated in such manner as to effect stabilization thereof, such stabilized compositions of matter being of particular importance for uses as detergents and as wetting, dispersing, emulsifying and foaming agents.

In a co-pending application, Serial No. 670,856, filed May 18, 1946 (now Patent No. 2,452,943), by Malkemus, Potter and Ross, there are described methods for sulphating monohydric and polyhydric alcohols and derivatives thereof having at least one free hydroxy group, by reaction with sulphamic acid according to which there is employed a catalyst comprising an amide or amide-like substance such as acetamide, urea, thiourea, dicyandiamide, etc. The alcohols and alcohol derivatives used in carrying out the reaction may be any primary or secondary alcohol, such as aliphatic, alicyclic and aromatic monohydric and dihydric alcohols, glycols, glycerols, diglycerols and polyglycerols, and polyhydric alcohols in general, any alcohol or alcohol derivative having at least one functional alcoholic-OH group remaining in the molecule being suitable for use. Fatty acid hydroxy esters, fatty acid hydroxy amides, and simple fatty acid esters of polyhydric alcohols may also be used so long as at least one functional alcoholic-OH group is present in the molecule. Typical of such compounds are: lauryl alcohol, methyl undecyl carbinol, cyclohexanol, methyl ricinoleate, propylene glycol monoesters of capric, lauric, myristic, coconut and stearic acids, ethylene glycol monoesters of lauric, coconut and stearic acids, diethylene glycol monostearate, and glycerine derivatives such as monolaurin, monoolein, dicaprylin and dilaurin. These and other alcohols and alcohol derivatives are herein referred to by the generic terms "alcohols" and "alcohol derivatives."

According to the procedure disclosed in the aforesaid copending application, the reaction preferably is effected in the presence of a slight excess of sulphamic acid to insure complete sulphation of the hydroxy compound, and any excess sulphamic acid that might remain in the reaction product is neutralized with an alkaline material such as ammonia gas. While the process described in the said co-pending application is in general admirably suited to the production of desirable sulphation products, it has been found that under certain circumstances sulphation reaction products obtained in the manner mention, when dissolved in water or water-alcohol mixtures, gradually become more and more acidic due to decomposition of certain constituents thereof, with a consequent undesirable decrease in stability of the aqueous solutions prepared from such sulphation reaction products.

In accordance with the present invention, the foregoing and other disadvantages encountered in connection with the preparation of sulphation products of organic hydroxy compounds by the action of sulphamic acid, whether these compounds are prepared as set forth in the said co-pending application or by any other desired procedure, are overcome by simple and economical means, whereby there are obtained sulphation products having not only excellent wetting, deterging, emulsifying and foaming properties, but also excellent stability characteristics. These last-mentioned characteristics are extremely important from the point of view of satisfactory commercial exploitation of sulphation reaction products of the type indicated.

Accordingly, one of the principal objects of the present invention is to provide new and improved methods for effecting the stabilization of sulphation reaction products obtained by the action of sulphamic acid upon organic hydroxy compounds, whether prepared by the procedure described and claimed in the aforesaid co-pending application or otherwise.

Another object of the invention is to provide sulphation reaction products of the class obtained by the sulphamic acid sulphation of organic hydroxy compounds, which sulphation reaction products have been suitably treated in such manner as greatly to increase the stability thereof.

A still further object of the invention is to provide an improved class of sulphation reaction products derived from the sulphamic acid sulphation of organic hydroxy compounds, which sulphation reaction products have been suitably pretreated in such manner as substantially to increase the resistance to hydrolysis in aqueous solution of the said sulphation reaction products.

The manner in which these and other objects and features of the invention are attained will appear more fully from the following description thereof in which reference is made to typical and preferred procedures and examples in order to indicate more fully the nature of the invention but without intending in any way to limit the scope of the invention thereby.

It has been discovered that the sulphation reaction products obtained by reacting sulphamic acid and hydroxy compounds such as mono- and polyhydric alcohols and derivatives of such polyhydric alcohols as still contain one free hydroxyl group, and with or without the presence of catalysts such as those of the amide type, as disclosed and claimed in the co-pending application of Malkemus et al. referred to above, tend when dissolved in water or water-alcohol mixtures to become gradually acidic and to decompose due to hydrolysis of the sulphate group and, when partial esters of polyhydric compounds are employed as starting materials, hydrolysis of the carboxylic ester group or groups as well.

It will be recalled that the general reaction involved in the sulphation of the alcohols or alcohol derivatives still containing at least one free hydroxy group here under consideration proceeds as follows:

$$R.OH + NH_2.SO_3H \rightarrow R.OSO_3.NH_4$$

Furthermore, when the starting material consists of or contains a partial ester of a polyhydric compound, as for example a monoglyceride, then the sulphated reaction products will of course contain at least one carboxylic ester group.

The hydrolysis in water of the sulphate group and, when there is present one or more carboxylic ester groups, the hydrolysis of such groups may be regarded conveniently as proceeding as follows:

$$-C-OSO_3.NH_4 + H_2O \rightarrow -C-OH + HOSO_3.NH_4$$

and $$-C-OOC.R + H_2O \rightarrow -C-OH + R.COOH$$

respectively.

It has been discovered that the presence of sulphamate ion in aqueous solution on the acid side (i. e., pH 7.0 or less, for example, 6.0) causes such solutions progressively to become more acidic and thus further to accelerate the hydrolysis of sulphate and, when present, carboxylic ester groups. Thus, the pH of a 2% ammonium sulphamate solution dropped from 6.0 to 2.7 after standing overnight at 130° F. When free sulphamic acid itself is present, this becomes hydrolyzed to $NH_4.SO_4.H$ at a relatively rapid rate, thus increasing the acidity of the aqueous solutions of sulphation reaction product, and "pyramiding" the deleterious effect of hydrolysis on the principal sulphation reaction product. This illustrates the importance of effecting as complete an initial destruction of sulphamate ion in the sulphation reaction product as is possible, since any sulphamate ion remaining contributes in a very undesirable manner to the instability and consequent destruction of the desired sulphation reaction product which it is the object to produce in stable form.

In accordance with the present invention, it has been discovered that the crude sulphation reaction products derived from the sulphamic acid sulphation of alcohols or of alcohol derivatives still containing at least one free hydroxyl group, and which crude products contain sulphate groups, and/or compounds having carboxylic ester groups, and possibly other easily hydrolized compounds, may be subjected to a stabilizing treatment which includes the feature of treating the crude reaction products after substantial completion of the sulphation reaction, and while in water or water-alcohol solution, with nitrous acid, either as such, for example in the form of a freshly-prepared aqueous solution of nitrogen trioxide ($N_2O_3$), or in the form of an acid solution of an alkali metal nitrite such as sodium or potassium nitrite, which treatment causes the conversion of the sulphamate ion into the sulphate ion.

It is also desirable, at least in some instances, to include a further treatment with a reagent capable of insuring the destruction of any excess nitrite ion that may remain in the solution following the nitrous acid treatment, since in general the presence of nitrite ion in the final sulphation reaction product is not desirable. As reagents for this purpose it is preferred to employ a water-soluble organic amide such as urea, thiourea, acetamide, benzamide, etc. Members of this class that are only sparingly soluble in water but which are more freely soluble in alcohol (e. g., benzamide) nevertheless are satisfactory, particularly in treating water-alcohol solutions according to the invention.

The reaction mechanism involved in the treatment with nitrous acid, e. g., in the form of an acid solution of sodium nitrite, may be expressed as follows:

$$H^+ + -SO_3NH_2 + NaNO_2 \rightarrow NaHSO_4 + N_2 + H_2O$$

The subsequent treatment with urea (or other amide or amide-like substance) is believed to have the following effect upon excess nitrous acid present in the sulphation reaction product:

$$NH_2.CO.NH_2 + 2HNO_2 \rightarrow CO_2 + 2N_2 + 3H_2O$$

and in general:

$$R.CO.NH_2 + HNO_2 \rightarrow R.COOH + N_2 + H_2O$$

In order to indicate even more fully the nature of the present invention, the following examples of typical procedure are set forth, it being understood that these examples are presented as illustrative only and that they are not intended to limit the scope of the invention. The parts given hereinafter are parts by weight unless otherwise indicated.

For the sake of completeness, there are first set forth hereinafter three examples (Nos. I, II and VII) taken from the aforesaid co-pending application of Malkemus et al. in order to indicate preferred procedure for obtaining in the first instance the sulphamic acid sulphation reaction products to the treatment of which the present invention is particularly applicable.

Example A 105 parts of sulphamic acid are suspended in 267 parts of propylene glycol monoester of coconut fatty acids, and 10 parts of dicyandiamide are added. The mixture is heated in an atmosphere of carbon dioxide to a temperature of from about 115° to 125° C. with constant stirring. The reaction product which soon begins to form remains suspended in the liquid and, as the reaction continues, a pasty, semi-solid mass is finally produced. The reaction is substantially completed in about eighty minutes, as indicated by titration of a sample of the product for free acid. The excess of sulphamic acid present in the mass is then neutralized by passing ammonia gas into the material, and there is obtained as a product a cream-colored paste which if desired may be dissolved in water to form a clear solution having a pH of 5.7 which foams well on agitation.

Example B 100 parts of sulphamic acid are agitated with 250 parts of coconut acid monoester of propylene glycol and 8 parts of acetamide at about 120° C. The reaction is completed in about thirty minutes, whereupon after the ammonia neutralization step a product is obtained which is quite soluble in water and which in aqueous solution foams very well when agitated.

Example C

A mixture of 200 parts methyl undecyl carbinol, 110 parts sulphamic acid and 25 parts urea was stirred at 110° C. for thirty minutes. The light tan mass obtained as a product after the ammonia neutralization step may be dissolved in water to give a clear solution which foams well on shaking.

Example I 100 parts of the crude sulphation reaction product obtained according to the procedure in Example A above are dissolved in a mixture of 400 parts of water and 100 parts of ethyl alcohol. To this mixture are added 5 parts of sodium nitrite followed by sufficient sulphuric acid to lower the pH of the solution to approximately 2.0. The mixture is then thoroughly agitated for a period of 15 to 30 minutes at room temperature, during which time gaseous nitrogen, resulting from the destruction of excess sulphamic acid present in the crude reaction product, is evolved. At the end of this time when the conversion of sulphamic acid to harmless reaction products has been substantially completed, the reaction mixture is treated with $NH_4OH$ in such quantity as to bring the pH up to approximately 6.5.

The water-alcohol solution of sulphation reaction product treated in this manner is found to have good foaming properties, and to possess enhanced stability characteristics as compared to a water-alcohol solution of a sulphation reaction product otherwise identical except that it has not been thus subjected to treatment with sodium nitrite under acid conditions. Thus the foregoing solution thus treated with nitrous acid and thereafter adjusted to a pH of 6.5 remained homogeneous after storage at 130° F. for 2 days, its pH dropping from 6.5 to 4.0 during this period, whereas an otherwise identical solution not treated with nitrous acid decomposed (split into two layers and its pH dropped from 6.5 to 3.0) after storage overnight at 130° F.

It will be appreciated, of course, that storage at 130° F. represents much more drastic test conditions than does storage at room temperature, so that a product which is able successfully to withstand storage for a substantial period at this elevated temperature may be regarded as a fairly stable product, particularly as compared to storage conditions for the same period of time at room temperature.

Example II

A portion of aqueous solution of the sulphation reaction product obtained according to the procedure of Example B above was divided into two portions. One of these portions was treated with ammonia to a pH of 6.0 and stored at 130° F. Within two days under these storage conditions its pH had fallen to 2.9, indicating drastic decomposition of the sulphation reaction product, and was worthless as a foaming agent.

Another portion of the same solution of sulphation reaction product was treated first with 5% of sodium nitrite, based on the weight of sulphation reaction product present in the solution, and then with sufficient suphuric acid to lower the pH of the solution to approximately 2.0. The mixture was then thoroughly agitated for 30 minutes at room temperature, during which time gaseous nitrogen was evolved. To the solution treated in this manner there was then added 10% of urea, based on the weight of sulphation reaction product present in the solution. The solution was then agitated for a period of 15 minutes at room temperature, during which time gaseous nitrogen resulting from the destruction of excess nitrite present in the solution was evolved. The pH of the aqueous solution of sulphation reaction product treated in this manner was then adjusted to 6.0. Upon storing the thus-treated sulphation reaction product at a temperature of 130° F. for a period of one week, its pH was found to be 5.5 and it had retained substantially undiminished its foaming properties.

Example III

A portion of aqueous solution of the sulphation reaction product obtained according to the procedure of Example C above was divided into two portions. One of these portions was treated with ammonia to a pH of 6.0 and stored at 130° F. Within two days under these storage conditions its pH had fallen to 3.0, indicating drastic decomposition of the sulphation reaction product, and was worthless as a foaming agent.

Another portion of the same solution of sulphation reaction product was treated first with a freshly-prepared aqueous solution of nitrogen trioxide containing 3% of $N_2O_3$, based on the weight of sulphation reaction product present in the solution, and then with sufficent sulphuric acid to lower the pH of the solution to approximately 2.0. The mixture was then thoroughly agitated for 20 minutes at room temperature, during which time gaseous nitrogen was evolved. To the solution treated in this manner there was then added 5% of acetamide, based on the weight of sulphation reaction product present in the solution. The solution was then agitated for a period of 15 minutes at room temperature, during which time gaseous nitrogen resulting from the destruction of excess nitrite present in the solution was evolved. The pH of the aqueous solution of sulphation reaction product treated in this manner was then adjusted to 6.5. Upon storing the thus-treated sulphation reaction product at a temperature of 130° F. for a period of one week, its pH was found to be 5.8 and it had retained substantially undiminished its foaming properties.

In carrying out the treatment with nitrous acid, as well as the subsequent treatment with an amide or amide-like compound, it is quite satisfactory to operate at substantially room temperature. Higher or lower temperatures may be employed, however, if desired.

The quantity of reagents employed for the treatment described herein may be varied over rather wide limits. In general it is preferred to employ nitrous acid, or compounds capable of generating nitrous acid in situ, in an amount corresponding approximately to 1 to 10%, based on the weight of sulphation reaction product present in the solution undergoing treatment. The quantity of the amide or amide-like compound to be employed in destroying excess nitrite may also be varied over rather wide limits, it being preferred to employ from about 1 to 10%, likewise based upon the weight of sulphation reaction product in the solution undergoing treatment.

In certain cases it may be found preferable to determine the optimum quantities of these reagents to be employed under any particular conditions by making one or a few trial runs on small aliquots of the main batch of material to be treated, and from the results of these trial runs determining the optimum amounts most preferably employed for the treatment proper.

The stabilized sulphation reaction products produced in accordance with the present invention possess extremely useful surface active properties and may be employed as detergents, wetting agents, foaming agents, emulsifiers, or dispersing agents. These products may be used by themselves or with other detergents, fillers, and the like in the form of cakes, bars, beads, flakes, chips, pastes, or liquids. They are useful as shampoos, dental detergents and for washing or cleaning purposes. They may also be used in dyeing processes, as dispersing agents in oil and water paints, fungicides, and similar compositions. They are excellent emulsifiers for use in cosmetics, waxes, polishes and in ore flotation processes, and may be used as demulsifiers for water-in-oil petroleum emulsions. They are also useful in lubricants and may be employed as anti-splattering agents for cooking fats. Many other applications will occur to those skilled in the art.

In general, the stabilized products are light-colored, pasty compositions which are largely soluble in water. They are non-toxic and non-irritating to the skin, and do not have a pronounced odor.

While various specific examples of preferred compositions and methods embodying the present invention have been described above, it will be apparent that many changes and modifications may be made in the methods of procedure, and that a wide variety of specific reagents may be employed in carrying out the procedure. It should therefore be understood that the examples cited and the particular proportions and methods of procedure set forth above are intended to be illustrative only, and are not intended to limit the scope of the invention.

We claim:

1. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises treating said sulphated product with nitrous acid.

2. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises treating said sulphated product in aqueous solution with an alkali metal nitrite in the presence of an acid.

3. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises treating said sulphated product in aqueous solution with nitrous acid, and thereafter treating the sulphated product with a water-soluble amide in order to destroy excess nitrite ion.

4. A method as defined in claim 3 wherein the water-soluble amide is acetamide.

5. A method as defined in claim 3 wherein the water-soluble amide is urea.

6. A method as defined in claim 3 wherein the water-soluble amide is thiourea.

7. A method for stabilizing a sulphated product formed by reacting (a) sulphamic acid with (b) an organic compound consisting of C, H and O atoms and containing at least one functional group selected from the class consisting of ethers, carboxylic acid esters and alcohols, said organic compound containing at least one alcoholic-OH group capable of sulphation, there being present in the said organic compound no oxygen other than in the form of ethereal oxygen, carboxylic acid ester oxygen or alcoholic oxygen, said sulphated product containing residual sulphamic acid, which comprises dissolving said sulphated product in aqueous solution, treating the aqueous solution with an alkali metal nitrite and a mineral acid added in amount sufficient to acidify the solution and generate nitrous acid in situ, and thereafter treating the solution with a water-soluble amide under conditions such that excess nitrite ion remaining in the solution is destroyed.

JOHN RANDOLPH CLARK.
JOHN DAVID MALKEMUS.
JOHN ROSS.

REFERENCES CITED

The following references are of record in the file of this patent:

UNITED STATES PATENTS

| Number | Name | Date |
|---|---|---|
| 2,326,270 | Werntz | Aug. 10, 1943 |

FOREIGN PATENTS

| Number | Country | Date |
|---|---|---|
| 382,942 | Great Britain | 1932 |

OTHER REFERENCES

Karrer, "Organic Chemistry" (2nd English ed., 1946), pp. 126 and 211.